US010453128B2

(12) United States Patent
Garrity et al.

(10) Patent No.: US 10,453,128 B2
(45) Date of Patent: Oct. 22, 2019

(54) SYSTEM AND METHOD FOR PROCESSING LOAN APPLICATIONS

(71) Applicant: CommunityLend Holdings Inc., Toronto (CA)

(72) Inventors: Michael Garrity, Toronto (CA); Casper Wong, Toronto (CA); Paul Sehr, Toronto (CA)

(73) Assignee: CommunityLend Holdings Inc., Toronto (CA)

( * ) Notice: Subject to any disclaimer, the term of this patent is extended or adjusted under 35 U.S.C. 154(b) by 211 days.

(21) Appl. No.: 14/434,456

(22) PCT Filed: Feb. 28, 2013

(86) PCT No.: PCT/CA2013/050148
§ 371 (c)(1),
(2) Date: Apr. 9, 2015

(87) PCT Pub. No.: WO2014/056101
PCT Pub. Date: Apr. 17, 2014

(65) Prior Publication Data
US 2015/0269671 A1 Sep. 24, 2015

Related U.S. Application Data
(60) Provisional application No. 61/711,604, filed on Oct. 9, 2012.

(51) Int. Cl.
G06Q 40/02 (2012.01)
H04W 4/00 (2018.01)

(52) U.S. Cl.
CPC ........... *G06Q 40/025* (2013.01); *G06Q 40/02* (2013.01); *H04W 4/00* (2013.01)

(58) Field of Classification Search
CPC ........ G06Q 40/025; G06Q 40/02; H04W 4/00
See application file for complete search history.

(56) References Cited

U.S. PATENT DOCUMENTS

| 5,611,052 A * | 3/1997 | Dykstra | G06Q 40/00 705/35 |
| 5,774,882 A * | 6/1998 | Keen | G06Q 20/403 705/35 |

(Continued)

FOREIGN PATENT DOCUMENTS

| JP | 2008305292 A | * 12/2008 |
| JP | 2008305292 A1 | * 12/2008 |

OTHER PUBLICATIONS

International Search Report (ISR) for WO2014056101. Whole document.

(Continued)

*Primary Examiner* — Bennett M Sigmond
*Assistant Examiner* — Bolko M Hamerski
(74) *Attorney, Agent, or Firm* — McMillan LLP

(57) ABSTRACT

A system method for quickly and easily processing a loan application is disclosed. The original application is processed quickly using supplemental technology such as a barcode scanner, mag-stripe reader, biometric or card tap device to fill out the applicant's personal details. If the application is approved a seamless transition is made within the mobile device to collect any additional information and allow the applicant to use e-signatures and sign the document directly on the device. Any additional documents needed to disburse a loan are collected by taking a photo of the document and optionally processing it via OCR with the mobile device's camera.

17 Claims, 9 Drawing Sheets

(56) References Cited

U.S. PATENT DOCUMENTS

| | | | | |
|---|---|---|---|---|
| 6,072,894 A * | 6/2000 | Payne | G07C 9/00158 | 235/375 |
| 6,988,085 B2 * | 1/2006 | Hedy | G06Q 20/10 | 235/375 |
| 7,802,721 B2 * | 9/2010 | Wilson, Jr. | G06Q 30/018 | 235/380 |
| 7,845,558 B2 * | 12/2010 | Beemer | G06Q 20/3276 | 235/462.01 |
| 8,228,299 B1 * | 7/2012 | Maloney | G06Q 20/14 | 345/173 |
| 8,909,551 B2 * | 12/2014 | Pawlusiak | G06Q 40/02 | 705/35 |
| 9,514,357 B2 * | 12/2016 | Macciola | H04N 1/387 | |
| 9,704,186 B1 * | 7/2017 | Cox | G06Q 30/0601 | |
| 2002/0007341 A1 * | 1/2002 | Lent | G06Q 30/06 | 705/38 |
| 2003/0220804 A1 * | 11/2003 | Wilson, Jr. | G06Q 30/018 | 705/317 |
| 2003/0220879 A1 * | 11/2003 | Gaughan | G06Q 40/02 | 705/51 |
| 2005/0080649 A1 * | 4/2005 | Alvarez | G06Q 10/1057 | 705/4 |
| 2005/0108063 A1 * | 5/2005 | Madill, Jr. | G06Q 40/08 | 705/4 |
| 2005/0178834 A1 * | 8/2005 | Natsuno | G06K 17/00 | 235/449 |
| 2005/0180618 A1 * | 8/2005 | Black | G06F 3/03545 | 382/124 |
| 2005/0187860 A1 * | 8/2005 | Peterson | G06Q 40/02 | 705/38 |
| 2005/0224573 A1 * | 10/2005 | Yoshizane | G06F 21/32 | 235/379 |
| 2007/0005426 A1 * | 1/2007 | Walker | B42D 15/00 | 705/14.1 |
| 2007/0038497 A1 * | 2/2007 | Britti | G06Q 10/06 | 726/26 |
| 2007/0076868 A1 * | 4/2007 | Ming | G09C 5/00 | 380/54 |
| 2007/0080207 A1 * | 4/2007 | Williams | G06Q 10/02 | 235/379 |
| 2007/0271175 A1 * | 11/2007 | Shaden | G06Q 40/02 | 705/38 |
| 2007/0290499 A1 | 12/2007 | Tame | | |
| 2008/0040259 A1 * | 2/2008 | Snow | G06Q 40/02 | 705/38 |
| 2010/0016003 A1 * | 1/2010 | Shapiro | H04L 43/0811 | 455/466 |
| 2010/0082485 A1 | 4/2010 | Lin et al. | | |
| 2010/0114744 A1 * | 5/2010 | Gonen | G06Q 40/00 | 705/35 |
| 2010/0274723 A1 | 10/2010 | Joao | | |
| 2011/0125632 A1 * | 5/2011 | Neel | G06Q 40/02 | 705/38 |
| 2012/0095853 A1 * | 4/2012 | von Bose | G06Q 20/20 | 705/16 |
| 2013/0022231 A1 * | 1/2013 | Nepomniachtchi | G06Q 20/042 | 382/102 |
| 2013/0037607 A1 * | 2/2013 | Bullwinkel | G07C 9/00079 | 235/380 |
| 2013/0066767 A1 * | 3/2013 | Fusco | G06Q 40/025 | 705/38 |
| 2013/0117647 A1 * | 5/2013 | WeissMalik | G06Q 10/10 | 715/205 |
| 2013/0211916 A1 * | 8/2013 | Putman | G06Q 30/02 | 705/14.58 |
| 2013/0297488 A1 * | 11/2013 | Boyanov | G06Q 40/025 | 705/38 |
| 2013/0332359 A1 * | 12/2013 | Qteishat | G06Q 20/4014 | 705/44 |
| 2014/0270465 A1 * | 9/2014 | Gorski | G06K 9/78 | 382/137 |

OTHER PUBLICATIONS

International Preliminary Report on Patentability (IPRP) for WO2014056101. Whole document.
Written Opinion for WO2014056101. Whole document.

* cited by examiner

SYSTEM AND METHOD FOR PROCESSING LOAN APPLICATIONS

FIELD OF THE INVENTION

The invention relates generally to the field of applications for financial services, and in particular, to systems and methods for processing loan applications.

BACKGROUND OF THE INVENTION

Consumer loan applications offered through merchants have traditionally been processed by collecting all the data needed to assess the applicant up-front—either through a computer application, a website or on paper. After the application process, loan documents would then need to be filled out (either electronically or manually) and submitted manually via fax or as email attachments. Additional documentation such as identification, void cheques, and invoices also need to be collected and forwarded to the lender before the loan can be approved.

The application process described above would often take 20 minutes or longer for the merchant to complete and then the subsequent final approval process including the assembly of the additional documents could take hours or even days.

There is a need in the art for a system and method that improves processing times of prior art loan approval processes.

SUMMARY OF THE INVENTION

It is an objective of the invention to incorporate a number of time-reducing technologies and novel business processes to get the total application and approval process down to just a couple of minutes, all without compromising any of the regulatory requirements of a financial institution opening an account through a third party.

Accordingly, the invention permits a potential loan borrower's loan application to be carried out on location, and processed efficiently. First, the loan amount, type of item purchased and basic customer data are entered into the loan application form.

Borrower's personal data for this form can be gathered one of three ways, by scanning the 2D bar coding on a borrower ID (such as a driver's license) through a scanner or camera, by a "swipe" of borrower ID using a peripheral reader, or entered manually.

Once the form is complete it is submitted to an application running on a server which runs an ID check, scrubs the information against a set of databases of fraudulent addresses or terrorist lists, undertakes a credit bureau check of the borrower and then assesses the borrower's credit to decide on the appropriate rate based on the available lenders for that particular merchant.

The application is rejected or accepted based on the potential borrower's credit history The original application is processed quickly using supplemental technology such as a barcode scanner, magstripe reader, biometric or card tap device to fill out the applicant's personal details. If the application is approved a seamless transition is made within the mobile device to collect any additional information and allow the applicant to use e-signatures and sign the document directly on the device. Any additional documents needed to disburse a loan are collected by taking a photo of the document and optionally processing it via Optical character Recognition (OCR) with the mobile device's camera.

According to one embodiment of the invention, there is provided a method of processing a loan application in real time including inputting loan information into a loan application form, the loan application form electronically displayed on a mobile device, the mobile device in communication with a network, capturing a photograph of a barcode on a borrower identification using a camera in the mobile device, scanning the photograph for borrower information, populating the loan application form with the borrower information, sending the loan application form via the network to a loan application processing server for a criminal and credit history check based on the borrower information, and verifying the borrower information, and upon verifying, selecting a lender to disburse the loan based on the borrower information.

According to one aspect of the invention, the method further includes adjusting a plurality of loan parameters.

According to another aspect of the invention, the method further includes capturing a first photograph of the borrower, capturing a second photograph of the borrower's identification, and saving the first and second photographs to a computer readable medium.

According to another aspect of the invention, the method further includes generating documents for the borrower to endorse.

According to another aspect of the invention, the documents are generated electronically.

According to another aspect of the invention, the documents are endorsed electronically.

According to another aspect of the invention, the method further includes collecting banking information.

According to another aspect of the invention, the banking information includes photographing a void cheque.

According to another aspect of the invention, the method further includes submitting the endorsed documents to an administration system running on a server.

According to another aspect of the invention, the scanning is performed by a barcode scanning application running on the mobile device.

According to a second embodiment of the invention, there is provided a method of populating a loan application form on a mobile device including displaying a loan application form via a mobile app on the mobile device, activating a camera in the mobile device to capture a photograph of a barcode on a borrower identification, scanning and decoding the barcode to extract borrower information; and inputting the extracted borrower information into loan application form.

According to a third embodiment of the invention, there is provided a system for processing a loan application including a computer readable medium having a database with data imported from a loan application form filled out by a user, the loan application form electronically displayed on a mobile device, the mobile device in communication with a network, a camera on the mobile device for capturing a photograph of a barcode on a borrower identification, a scanner for scanning the photograph for borrower information, computer readable instructions on a computer readable medium that when executed by a computer system populates the loan application form with the borrower information, computer readable instructions on a computer readable medium that when executed by a computer system sends the loan application form via the network to a loan application processing server for a criminal and credit history check based on the borrower information, and computer readable instructions on a computer readable medium that when executed by a computer system verifies the borrower information, and upon verifying, selecting a lender to disburse the loan based on the borrower information.

According to an aspect of the third embodiment, the camera further captures a first photograph of the borrower, captures a second photograph of the borrower's identification; and further including a computer readable medium for saving the first and second photographs to a computer readable medium.

According to another aspect of the third embodiment, the system further includes computer readable instructions on a computer readable medium that when executed by a computer system generates documents for the borrower to endorse.

According to another aspect of the third embodiment, the system further includes computer readable instructions on a computer readable medium that when executed by a computer system endorses the documents.

According to another aspect of the third embodiment, the system further includes a computer system executing instructions for collecting banking information.

According to another aspect of the third embodiment, the banking information includes a photograph of a void cheque.

According to another aspect of the third embodiment, the system further includes a computer system executing instructions for submitting the endorsed documents to an administration system running on a server.

According to another aspect of the third embodiment, the scanner comprises a barcode scanning application running on the mobile device.

BRIEF DESCRIPTION OF THE DRAWINGS

Embodiments will now be described, by way of example only, with reference to the attached Figures, wherein.

DETAILED DESCRIPTION OF THE EMBODIMENTS

Figure 1:
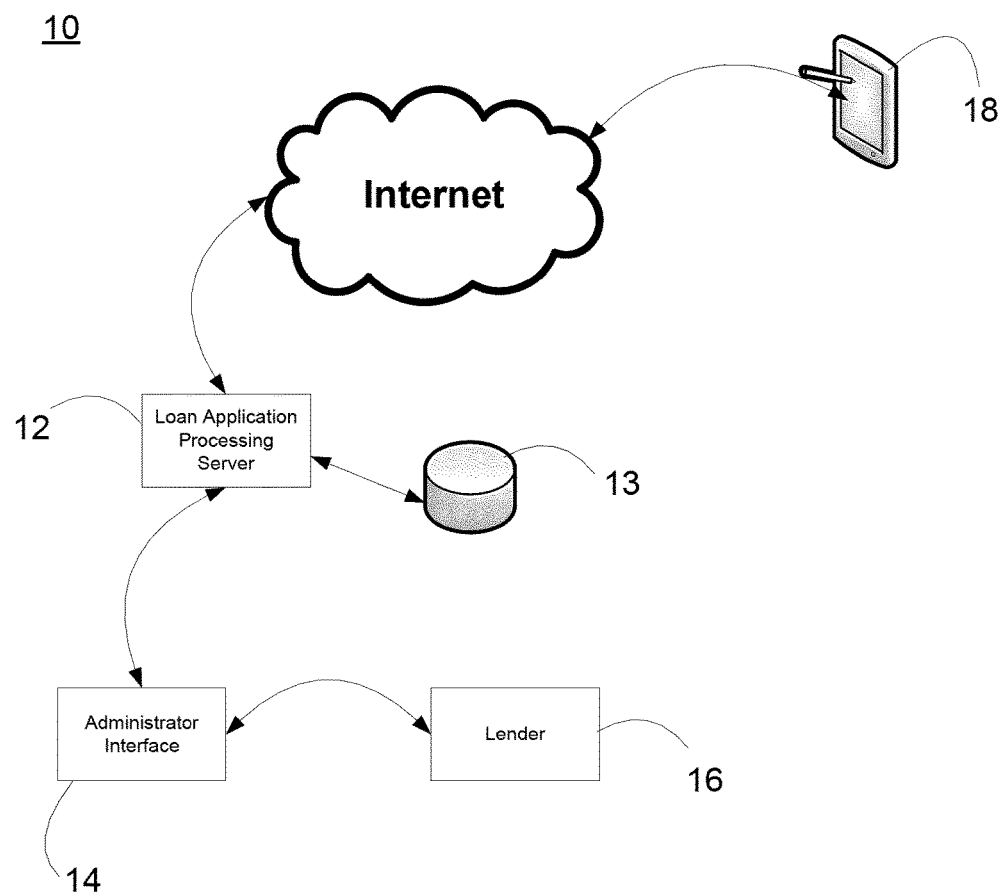
FIG. 1 is a schematic diagram of the loan application processing system.

Turning now to FIG. 1, a system for processing loan applications in real time is generally indicated by the reference numeral 10. The system has two technology layers: the origination layer and the administrative/lender layer. The origination layer has three entry points and multiple processes associated with each type of entry point. Those entry points are: 1. the web interface; 2. the Application Programming Interface (API) to a partner interface; and, 3. the mobile interface.

Loan application processing software is run on a loan application processing server 12 (also referred to as loan application server 12 or application server 12) having a database 13 connected thereto, the loan application processing server 12 accessible to an administrator user interface 14. The administrator user interface 14 can access the loan application processing software through an internet connection. The administrator is also in communication with a plurality of lender partners 16.

Merchants who are registered with the administrator 14 and the loan application processing server 12 can access the loan application processing server 12 via a merchant user interface 18 on the merchants' point-of-sale (POS) system. The merchant user interface 18 can be deployed via a web interface, a mobile application ("mobile app") running on a mobile device, or an application programming interface (API) integrated directly into the point-of-sale system.

Figure 2:
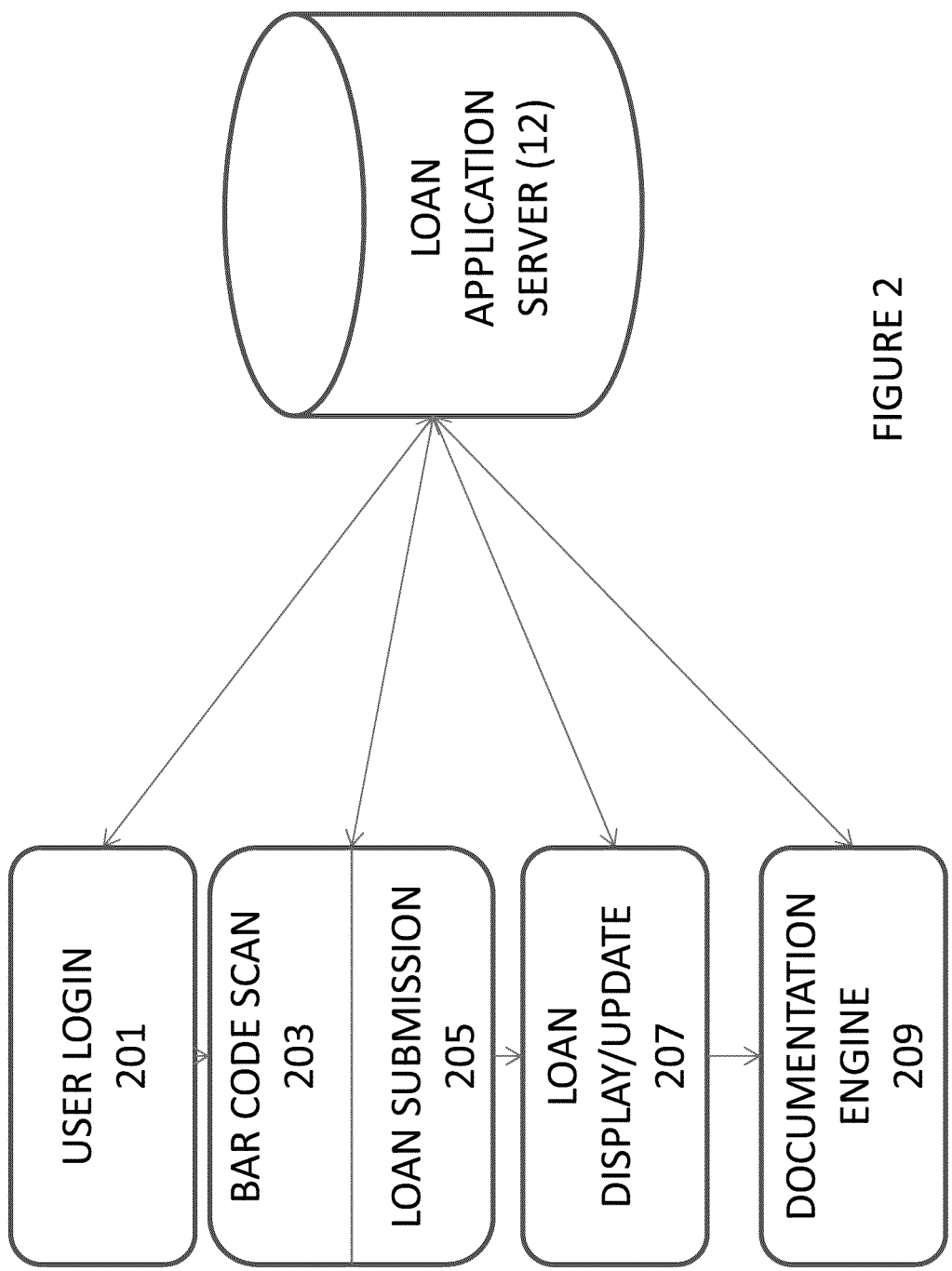
FIG. 2 is a block diagram showing the components of the merchant user interface mobile application.

FIG. 2 is a schematic drawing and shows the components of the merchant user interface 18 deployed via a mobile app. As illustrated, the interface displays information from software modules that enable a user login 201, activation of the bar code scan 203, submission of the loan 205, loan displaying/updating 207 and any other data necessary from the document engine 209. Each of these modules are in communication, and may exchange data with the loan application server 12.

Figure 3:
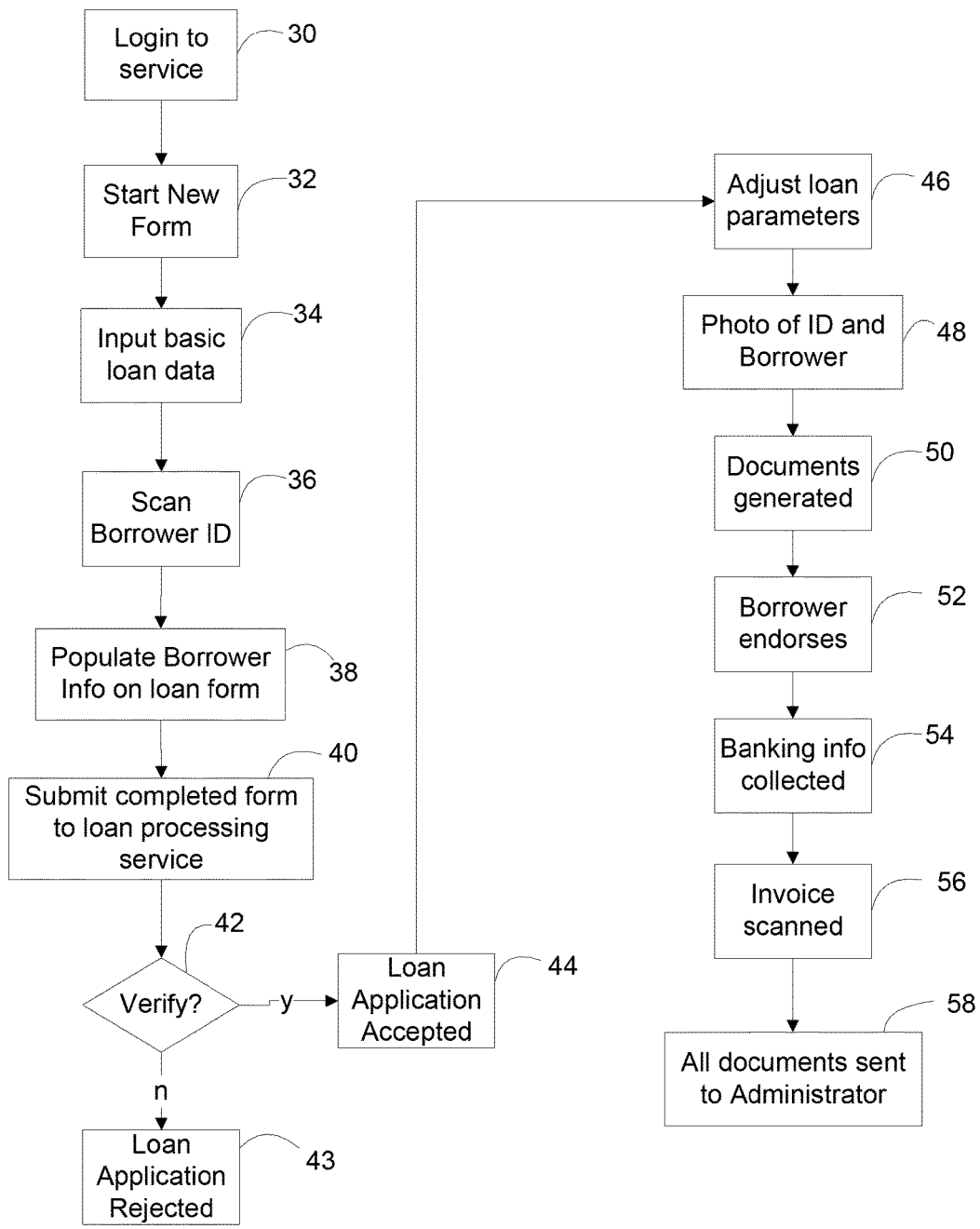
FIG. 3 is a flow diagram showing the steps used to populate the loan application form.

FIG. 3 is a flow diagram showing the steps the system performs for processing loan applications in real time. In step 30, the merchant logs into the merchant user interface 18 running on a mobile device, which is in communication with merchant's POS system. The mobile device also has internet connection via WiFi, Bluetooth, 3G, or any other type of internet connection. In step 32, the merchant selects to create a new loan. In step 34, the merchant inputs basic loan data into a form presented by the merchant user interface 18, an example of which can be seen in the exemplary screenshot in FIG. 4. This basic loan data can include the loan amount and type of item being purchased by a customer or loan borrower. In step 36, the borrower's personal information is gathered via the borrower's identification. The merchant can select to take a photograph of a 2-D bar code on the borrower's identification using the camera in the mobile device. When selected, the merchant user interface 18 will deploy the camera and the merchant can take the photograph. Once the photograph is captured, the barcode is scanned and decoded for the borrower's personal information. This process occurs through the device camera within the mobile application. Alternatively, scanning can be performed by a bar code scanning mobile app on the mobile device and imported into the merchant user interface 18. In a further alternative, a magnetic strip on the borrower's identification can be "swiped" using a peripheral magnetic strip reader. If none of these methods are available to the merchant, the numbers on the borrower's identification can be entered into the form manually.

In step 38, the information scanned from step 36 is used to populate the form. The borrower information is matched to the appropriate fields and automatically inserted.

The completed form is then submitted to the loan application processing server 12 in step 40. In step 42, the loan application processing server accesses a service which interprets the data and then performs an identification check, a criminal background check, a credit bureau check, and then checks the borrower's credit rating. If the identification, criminal, and credit check are not verified, then the borrower is rejected in step 43. If the identification, criminal, and credit check are verified, then the borrower is accepted in step 44 and an appropriate lender and rate are chosen based on what is available to the borrower for that particular merchant and the borrower's credit rating and history.

Figure 5:
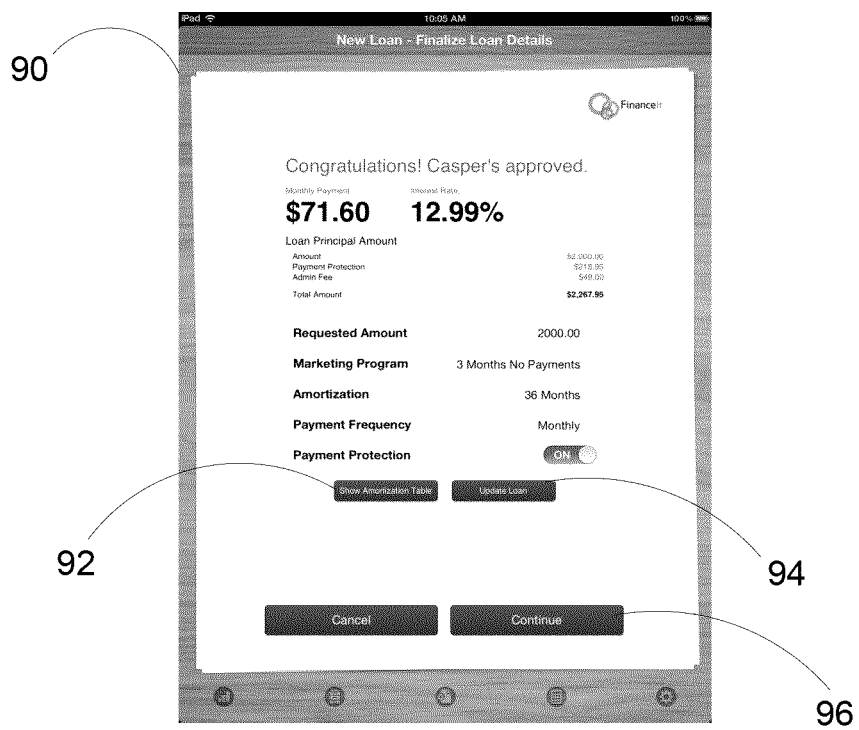
FIG. 5 shows an exemplary screenshot of an approval page where the applicant can adjust the loan parameters.

In step 46, the merchant optionally can adjust parameters of the loan to customize the loan for the borrower, as shown in the exemplary screenshot in FIG. 5. An example of the parameters the merchant can adjust is loan amortization period.

In step 48, additional borrower information is collected. This information can be used for further identification of the borrower, to demonstrate the merchant's due diligence in verifying the borrower's identification, or for auditing purposes. In one example, the merchant user interface 18 prompts the merchant to take a photo of the identification being used by the borrower and a photo of the borrower to secure the loan. The photographs can be taken by the camera within the mobile device, which is concurrently running the merchant user interface 18. In this example, the merchant user interface 18 will deploy the camera and the merchant can take the photographs. Once the photographs are captured, they are sent to the loan application server.

Figure 7:
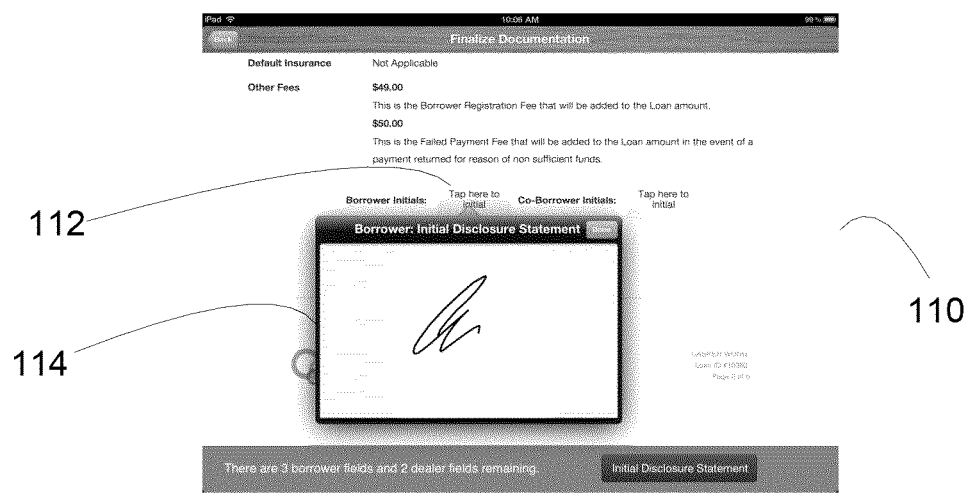
FIG. 7 shows an exemplary screenshot of the borrower's endorsement page.

In step 50, the merchant user interface 18 generates appropriate documents for the borrower to sign. These documents can be physically printed by an external printer and presented to the borrower. In step 52, the borrower endorses the documents by signing in the appropriate spot. Alternatively, the documents can be rendered on the mobile device running the merchant user interface 18. In this case, the borrower would sign the documents with a finger or stylus in the appropriate field as shown in the screenshot of FIG. 7.

In step 54, the merchant user interface 18 prompts the merchant for the borrower's banking information. The merchant user interface 18 can prompt the merchant to take a photo of a void cheque belonging to the borrower. If the merchant elects to take the photograph at that time, the merchant user interface deploys the camera in the mobile device which sends the captured images from the device to the loan application server. If the merchant chooses to take the photographs at a later time, the photograph can also be taken by a peripheral digital camera or the same mobile device, and then uploaded to the loan application processing server 12 at a later time. Alternatively, the void cheque can be scanned by a peripheral scanner or through the mobile device application, and uploaded to the loan application processing server 12 at a later time.

In step 56, the loan completion page also allows for an invoice of the purchased item to be collected through the invoice photo button 132. The copy of the invoice can be taken via the camera in a mobile device. The photo is sent to the loan application server. The invoice is collected in the application for the final loan file. Optionally, the merchant can provide the copy of the invoice at a later time, by taking a photo of the invoice through a peripheral digital camera and sending it to the loan application processing server 12 at a later time. Alternatively, the merchant can also scan the invoice via a peripheral scanner such as a flatbed scanner.

In step 58, the documents are sent to the loan application server and the loan application processing server 12 notifies the administrator via the administrator user interface 14 that a loan application is ready to be disbursed.

1. Mobile Interface:

The merchant user interface 18 will now be described in more detail with reference to FIGS. 4 to 9.

A merchant user interface 18 mobile app is first downloaded onto the device through the relevant application "store" provided by the device.

Assuming the partner has already registered with the service, the partner logs in through the login screen and their fully customized interface and pre-registered preferences are made available.

Figure 4:
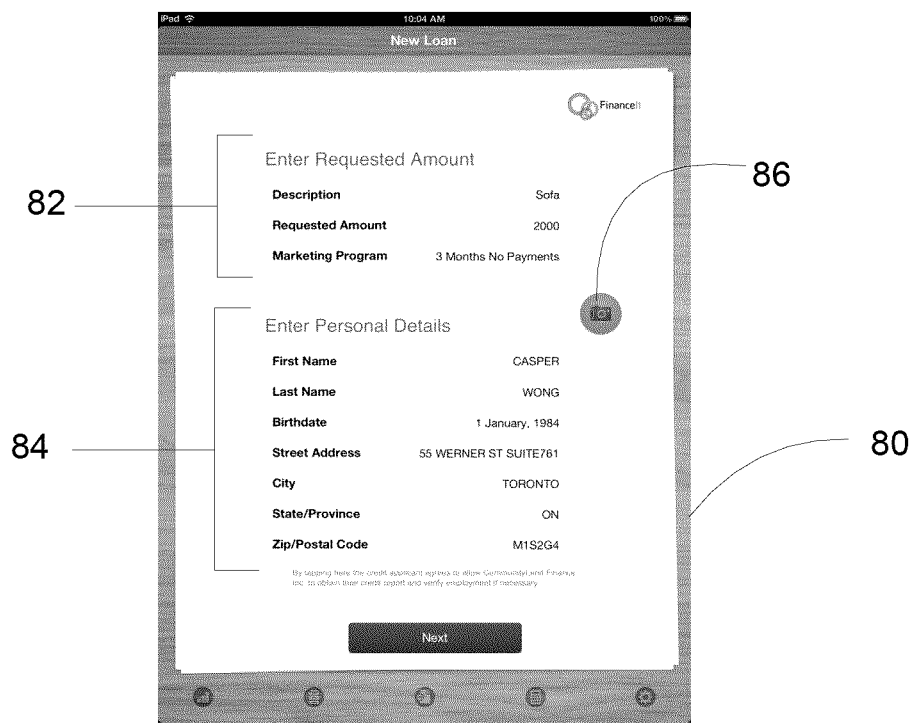
FIG. 4 shows an exemplary screenshot of the loan application form on an interface for collecting loan details.

From here the partner can start applying for loans. FIG. 4 shows an exemplary screenshot of the initial screen for a new loan application form and is generally referenced by the number 80. The form is displayed on a mobile device such as an iPad, or other tablet device, smart phone or other mobile device with connection to the internet through WiFi, Bluetooth, 3G, or any other type of internet connection. Basic loan information is entered in the top section 82 of the initial screen 80 such as the item to be purchased, the requested amount of the loan, and any applicable incentives for the purchase.

Borrower's personal data is gathered in the lower section 84 of the initial screen 80. In one example, the 2-D bar code on the borrower's identification can be scanned by a bar code scanning mobile app and a camera running on the mobile device. On the initial screen 80 a scanning button 86 is made available, which launches the camera and bar code scanning mobile app within the merchant user interface app. Once the bar code is scanned, the loan processing mobile app imports the decoded information and populates the borrower's personal data in the lower section 84. The borrower information is matched to the appropriate fields and automatically inserted. Alternatively, the borrower's information can also be captured by a "swipe" of borrower ID using a peripheral reader or it can be entered manually.

Once the application form is complete it is submitted automatically to the server application which runs an ID check, scrubs the information against a set of data bases of fraudulent addresses or terrorist lists, undertakes a credit bureau check of the borrower and then assesses the borrower's credit to decide on the appropriate rate based on the available lenders for that particular merchant.

The application is rejected or accepted based on their credit history. Sometimes there are multiple prime lenders and multiple non-prime lenders. The server system automatically assigns which lender will match which borrower and documents the loan accordingly.

FIG. 5 shows an exemplary screenshot of an approval page 90 on the mobile device app. On this approval page 90, the merchant is given the optional opportunity to adjust the loan amortization and other parameters, such as payment frequency, to tailor the loan to the borrower. The merchant can show the borrower an amortization table via the amortization table button 92 to aid in adjusting the parameters. When depressed, a new window will pop up with the table (not shown). If the merchant makes any changes to the parameters, the merchant will update the loan using the update button 94. When all changes have been made, the merchant presses the continue button 96 to move to the next page in the process.

Figure 6:
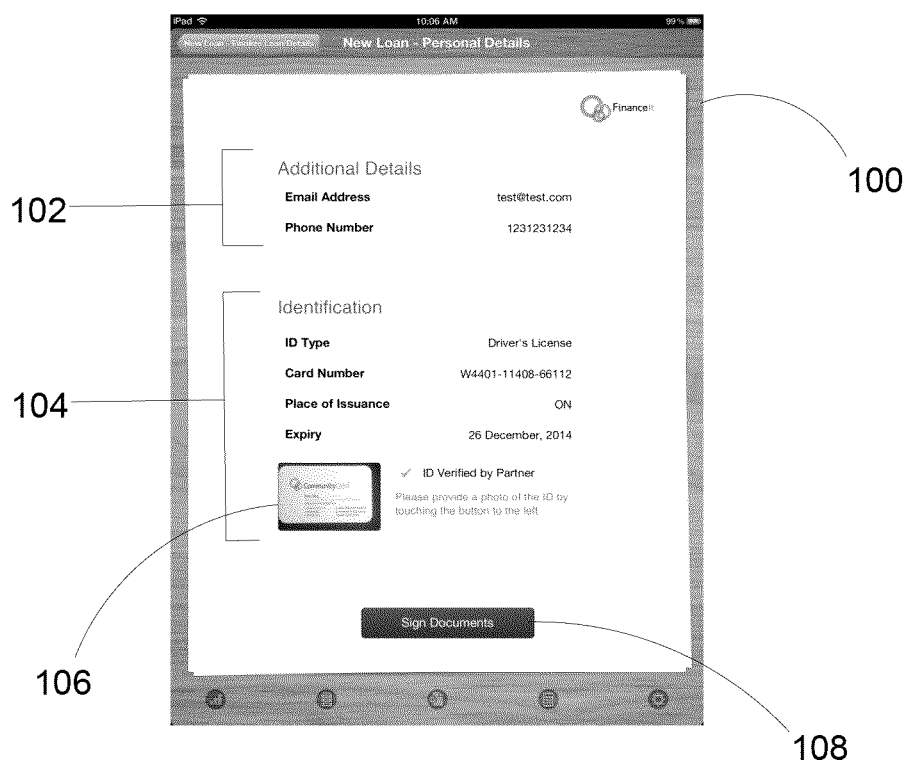
FIG. 6 shows an exemplary screenshot of a page where further borrower contact details can be gathered.

FIG. 6 shows an exemplary screenshot of a further details page 100 on the loan processing mobile app for collecting further borrower details. The further details page 100 allows for a photograph of the ID to be taken via the ID photo button 106. When the ID photo button is depressed, the mobile device's camera app is deployed. Once the ID 104 has been photographed, it is dated and time stamped by the loan processing mobile app, then stored on the loan application server. In an alternate embodiment, the merchant can also be prompted to take a photo of the borrower for further proof of identification to demonstrate that the merchant has done his or her due diligence in identifying the borrower. This information is all captured in the system for audit purposes. The merchant then continues the loan application process by pressing the sign document button 108.

FIG. 7 shows an exemplary screenshot of the loan documentation page 110 on the loan processing mobile app. This loan documentation page 110 generates the appropriate documents for the borrower (based on the item purchased, loan amount and duration, state or province of residence and lender). The loan documentation page is presented to the borrower for endorsement. When the signature button 112 is depressed, an endorsement pop-up screen 114 appears. The borrower can then sign in the appropriate space by using the mobile a finger or stylus.

Figure 8:
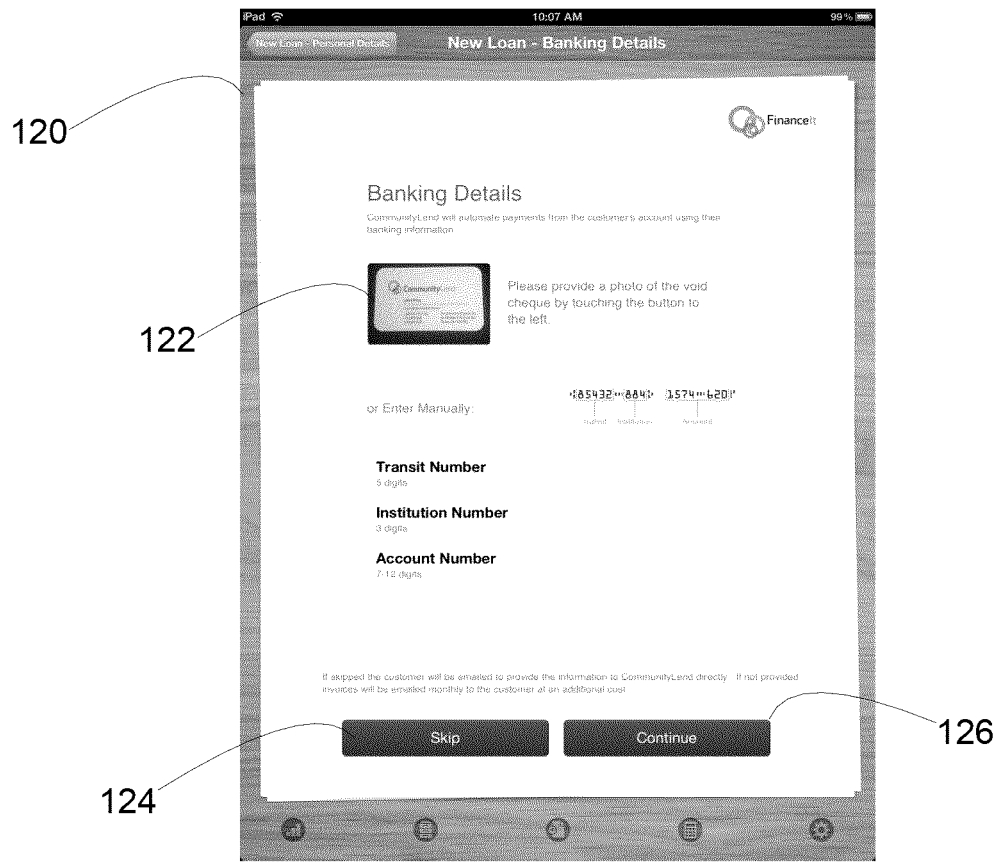
FIG. 8 shows an exemplary screenshot of a form where the borrower's bank account details can be gathered.

Once the loan documentation page is signed by the borrower, the bank details page 120 appears as shown in the exemplary screen shot of FIG. 8. Bank details are optionally collected in the loan application forms to detail from which banking institutions the lender will take payments the payment of the loan. The bank details page 120 allows for a photograph of a borrower's void cheque to be taken via a cheque photograph button 122. When the cheque photograph button 122 is depressed, the loan processing mobile app deploys the camera app in the mobile device to take a photo of the void cheque. The cheque information is captured using the mobile device camera or scanned using OCR and then imported into the bank details page 120. Alternatively, the banking information can be collected manually. The merchant then continues the loan application process by pressing the continue button 126. If the borrower is unable to provide the banking information at the time of the loan application process, the merchant is given the option of skipping this section via the skip button 124.

Figure 9:
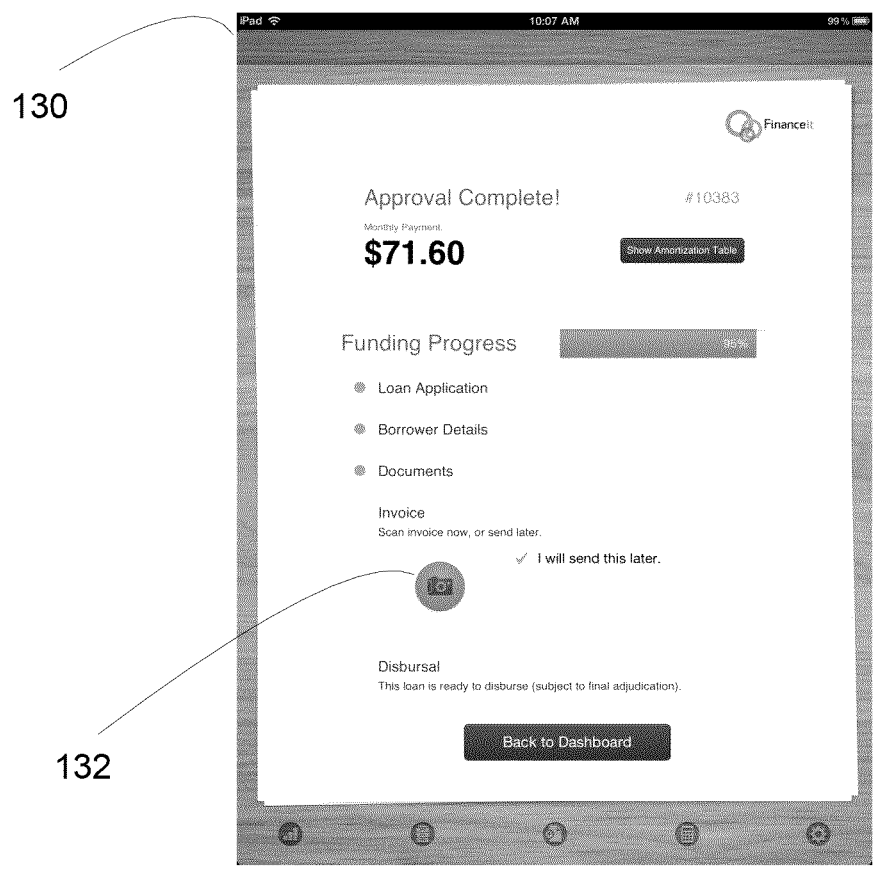
FIG. 9 shows an exemplary screenshot of the application complete page.

Once the banking details page 120 is completed or skipped, the loan processing mobile app moves onto the completion page 130 as shown in the exemplary screenshot in FIG. 9. The loan completion page 130 can show all the details of the loan and which documents have been completed for the loan. The loan completion page also allows for an invoice of the purchased item to be collected through the invoice photo button 132. When the invoice photo button is activated, the loan processing mobile app deploys the camera app in the mobile device to allow the merchant to take a photo of the invoice. The photo is stored to the loan application server. The invoice is collected in the application for the final loan file. Optionally, the merchant can provide the copy of the invoice at a later time, by taking a photo of the invoice through a peripheral digital camera and upload it to the mobile device. Alternatively, the merchant can also scan the invoice via a peripheral scanner such as a flatbed scanner. In a further alternative, the invoice can also be collected through integration with the merchant's point of sale system.

The loan is now ready to be disbursed and is available in final form for review in the Administrative system.

The above-described embodiments are intended to be examples of the present invention and alterations and modifications may be effected thereto, by those of skill in the art, without departing from the scope of the invention that is defined solely by the claims appended hereto.

What is claimed is:

1. A method of processing a loan application in real time using a mobile device in communication with a loan application processing server and an administration system through a network, the method comprising:
at the mobile device:
logging into a point-of-sale service in communication with the loan application processing server;
receiving loan information in an electronic loan application form, the loan application form displayed on the mobile device;
capturing a photograph of a barcode on a borrower identification using a camera in the mobile device, in response to the activation of a scanning button displayed on the mobile device;
scanning the photograph of the barcode for borrower information;
automatically populating the loan application form with the borrower information;
capturing a first photograph of the borrower using the camera in the mobile device;
capturing a second photograph of the borrower's identification using the camera in the mobile device, in response to the activation of an identification photo button displayed on the mobile device;
generating an electronic document;
displaying a pop-up signature window on the mobile device;
receiving a signature image from the borrower in the pop-up signature window via one of a stylus and a finger;
displaying a bank details page comprising a cheque photograph button;
receiving input indicative of the cheque photograph button being depressed;
upon receiving the input indicative of a cheque photograph button, capturing an image of a cheque using the camera;
capturing bank information on the cheque via optical character recognition (OCR);
importing and displaying the bank information in the bank details page;
displaying a completion page comprising an invoice photo button;
upon the invoice photo button being activated, capturing a photo of an invoice for an item to be purchased by the loan;
sending the loan application form with the loan information, and the photo of the invoice along with the first and second photographs via the network to the loan application processing server for a criminal and credit history check based on the borrower information, and for proving the identity of the borrower using the first and second photographs; and
wherein the administration system is in communication with a plurality of lenders, the loan application processing server is in communication with the network, and wherein the loan application processing server: verifies the identity of the borrower using the second photograph and the borrower information, and upon verifying, selects a lender among said plurality of lenders to disburse the loan based on the borrower information.

2. The method of claim 1 further comprising adjusting a plurality of loan parameters prior to said sending.

3. The method of claim 1 further comprising: saving the first and second photographs to a non-transitory computer readable medium.

4. The method of claim 1 further comprising generating documents for the borrower to endorse.

5. The method of claim 4 wherein the documents are generated electronically.

6. The method of claim 5 wherein the documents are endorsed electronically.

7. The method of claim 1 further comprising manually collecting the banking information.

8. The method of claim 7 wherein the step of collecting banking information is skipped.

9. The method of claim 7 further comprising submitting the endorsed documents to the administration system.

10. The method of claim 1 wherein the scanning is performed by a barcode scanning application running on the mobile device.

11. A system for processing a loan application, comprising:
a mobile device comprising: a non-transitory computer readable medium having a database with data imported from a loan application form filled out by a user, the loan application form electronically displayed on the mobile device, the mobile device in communication with an administration system and a loan application processing server through a network; the mobile device further comprising a camera; a scanner; and a mobile application comprising computer readable instructions on the non-transitory computer readable medium that when executed by the mobile device:
receives login data and logs into a point-of-sale service in communication with the loan application processing server;
displays a scanning button on the mobile device;
captures a photograph of a barcode on a borrower identification using the camera, in response to the activation of the scanning button;
scans the barcode for borrower information using the scanner;
automatically populates the loan application form with the borrower information;
captures a first photograph of the borrower using the camera;
displays an identification photo button on the mobile device;
captures a second photograph of the of the borrower's identification using the camera, in response to the activation of the identification photo button;
generates an electronic document;
displays a pop-up signature window for the electronic document;
receives a signature image from the borrower in the pop-up signature window via one of a stylus and a finger;
displays a bank details page comprising a cheque photograph button;
receives input indicative of the cheque photograph button being depressed;
upon receiving the input indicative of a cheque photograph button, captures an image of a cheque using the camera;
captures bank information on the cheque via optical character recognition (OCR);
imports and displays the bank information in the bank details page;
displays a completion page comprising an invoice photo button;
upon the invoice photo button being activated, captures a photo of an invoice for an item to be purchased by the loan;
sends the loan application form along with the first and second photographs via the network to the loan application processing server for a criminal and credit history check based on the borrower information, and for proving the identity of the borrower using the first and second photographs;
wherein the administration system is in communication with a plurality of lenders, the loan application processing server is in communication with the network, and wherein the loan application processing server: verifies the identity of the borrower using the second photograph and the borrower information, and upon verifying, selects a lender among said plurality of lenders to disburse the loan based on the borrower information.

12. The system of claim 11 wherein the computer readable instructions on the non-transitory computer readable medium further generate documents for the user to endorse.

13. The system of claim 12 wherein the computer readable instructions on the non-transitory computer readable medium further include instructions for endorsing the documents.

14. The system of claim 11 further comprising instructions for manually collecting banking information.

15. The system of claim 14 wherein the cheque is a void cheque.

16. The system of claim 15 further comprising instructions for submitting the endorsed documents to the administration system.

17. The system of claim 11 wherein the scanner comprises a barcode scanning application running on the mobile device.

* * * * *